United States Patent
Kawai et al.

(10) Patent No.: US 8,612,202 B2
(45) Date of Patent: Dec. 17, 2013

(54) CORRELATION OF LINGUISTIC EXPRESSIONS IN ELECTRONIC DOCUMENTS WITH TIME INFORMATION

(75) Inventors: Takao Kawai, Tokyo (JP); Satoshi Nakazawa, Tokyo (JP); Shinichi Ando, Tokyo (JP)

(73) Assignee: NEC Corporation, Tokyo (JP)

( * ) Notice: Subject to any disclaimer, the term of this patent is extended or adjusted under 35 U.S.C. 154(b) by 376 days.

(21) Appl. No.: 13/057,842

(22) PCT Filed: Sep. 4, 2009

(86) PCT No.: PCT/JP2009/004399
§ 371 (c)(1),
(2), (4) Date: Feb. 7, 2011

(87) PCT Pub. No.: WO2010/035412
PCT Pub. Date: Apr. 1, 2010

(65) Prior Publication Data
US 2011/0137641 A1    Jun. 9, 2011

(30) Foreign Application Priority Data

Sep. 25, 2008  (JP) ................................ P2008-245162

(51) Int. Cl.
*G06F 17/20* (2006.01)
*G06F 17/30* (2006.01)

(52) U.S. Cl.
USPC ................ 704/1; 707/725; 707/726; 707/748

(58) Field of Classification Search
USPC .......... 704/1, 9, 270; 707/725, 728, 730, 739, 707/750, 751, 748, 726
See application file for complete search history.

(56) References Cited

U.S. PATENT DOCUMENTS

| | | | |
|---|---|---|---|
| 5,893,114 A * | 4/1999 | Hashimoto et al. | |
| 6,537,324 B1 * | 3/2003 | Tabata et al. | 715/205 |
| 6,782,393 B1 * | 8/2004 | Balabanovic et al. | |
| 7,398,202 B2 * | 7/2008 | Suzuki et al. | 704/9 |
| 7,739,254 B1 * | 6/2010 | Osinga | 707/705 |
| 7,809,721 B2 * | 10/2010 | Putivsky et al. | 707/725 |
| 7,962,437 B2 * | 6/2011 | Brandenburg et al. | 707/725 |
| 8,037,064 B2 * | 10/2011 | Song et al. | 707/726 |
| 8,037,086 B1 * | 10/2011 | Upstill et al. | 707/767 |
| 8,131,702 B1 * | 3/2012 | Bharat et al. | 707/725 |
| 8,290,921 B2 * | 10/2012 | Liu et al. | 707/725 |

(Continued)

FOREIGN PATENT DOCUMENTS

| | | |
|---|---|---|
| JP | 7-13598 A | 1/1995 |
| JP | 10-143371 A | 5/1998 |

(Continued)

OTHER PUBLICATIONS

International Search Report for PCT/JP2009/004399 mailed Oct. 6, 2009.

*Primary Examiner* — Martin Lerner

(57) ABSTRACT

An information analysis device includes a correlation value calculation unit which specifies the number of appearances of links between one linguistic expression and other linguistic expression and an appearance time of each link based on link information. The correlation value calculation unit calculates a correlation value between the one linguistic expression and the other linguistic expression according to a degree that the link continuously appears by using the specified number of appearances of the link and the appearance time of each link.

21 Claims, 7 Drawing Sheets

(56) References Cited

U.S. PATENT DOCUMENTS

| | | | |
|---|---|---|---|
| 8,296,645 B2* | 10/2012 | Shimizu | 707/726 |
| 8,335,785 B2* | 12/2012 | Adar et al. | 707/725 |
| 8,407,214 B2* | 3/2013 | Li et al. | 707/726 |
| 8,442,923 B2* | 5/2013 | Gross | 707/725 |
| 2004/0049499 A1* | 3/2004 | Nomoto et al. | 707/3 |
| 2005/0071365 A1* | 3/2005 | Hou et al. | 707/102 |
| 2006/0253427 A1* | 11/2006 | Wu et al. | 707/3 |
| 2009/0063469 A1* | 3/2009 | Gross | 707/5 |
| 2009/0248678 A1* | 10/2009 | Okamoto et al. | 707/5 |
| 2010/0076990 A1* | 3/2010 | Akamine et al. | 707/758 |
| 2010/0312792 A1* | 12/2010 | Ando et al. | 707/769 |
| 2010/0318526 A1* | 12/2010 | Nakazawa et al. | 707/749 |

FOREIGN PATENT DOCUMENTS

| | | |
|---|---|---|
| JP | 10-320419 A | 12/1998 |
| JP | 11-312168 A | 11/1999 |
| JP | 2006039811 A | 2/2006 |
| JP | 2006134183 A | 5/2006 |
| JP | 2006164045 A | 6/2006 |
| JP | 2007079730 A | 3/2007 |
| JP | 2008152634 A | 7/2008 |

* cited by examiner

FIG. 2

| DOCUMENT ID | TIME INFORMATION | DOCUMENT CONTENT | REFERENCE DOCUMENT ID |
|---|---|---|---|
| 10001 | 2004/4/16 | ... ASEISMATIC GEL IS EFFECTIVE, BUT ... | 9989 |
| ⋮ | ⋮ | ⋮ | ⋮ |
| 10102 | 2004/4/22 | ... ○○ EARTHQUAKE OCCURRED ... | 8056, 10001 |
| ⋮ | ⋮ | ⋮ | ⋮ |
| 11003 | 2004/5/26 | ... ASEISMATIC GEL WAS EFFECTIVE ... | 10101, 10102 |
| ⋮ | ⋮ | ⋮ | ⋮ |
| 12004 | 2004/6/13 | ... △△ EARTHQUAKE OCCURRED ... | 9032, 11003 |
| ⋮ | ⋮ | ⋮ | ⋮ |

FIG. 3

| LINK INFORMATION | | |
|---|---|---|
| NO. | APPEARANCE TIME OF LINK IN LINGUISTIC EXPRESSION X | APPEARANCE TIME OF LINK IN LINGUISTIC EXPRESSION Y |
| 1 | 2004/4/15 | 2004/4/22 |
| ⋮ | ⋮ | ⋮ |
| n | 2004/6/25 | 2004/6/13 |
| ⋮ | ⋮ | ⋮ |
| N | 2004/○/△△ | 2004/□/○△ |

FIG. 4

| LINK INFORMATION | |
|---|---|
| NO. | APPEARANCE TIME (REPRESENTATIVE TIME) |
| 1 | 2004/4/18 |
| ⋮ | ⋮ |
| n | 2004/6/3 |
| ⋮ | ⋮ |
| N | 2004/○/△ |

CORRELATION OF LINGUISTIC EXPRESSIONS IN ELECTRONIC DOCUMENTS WITH TIME INFORMATION

This application is the National Phase of PCT/JP2009/004399, filed Sep. 4, 2009, which claims priority to and the benefit of Japanese Patent Application No. 2008-245162 filed on Sep. 25, 2008, the disclosure of which is incorporated herein by reference.

TECHNICAL FIELD

The present invention relates to an information analysis device, an information analysis method, and a program, and more particularly, to an information analysis device, an information analysis method, and a program in which a relationship between linguistic expressions is analyzed based on time information.

BACKGROUND ART

In recent years, with the rapid development of the Internet, a large amount of information has been continuously distributed in the world through web pages, electronic bulletin boards, and blogs on the Internet. Since a large amount of information is distributed, for an information user, the cost of finding information of interest among information on the Internet increases, and an appropriate analysis technique is required.

Nowadays, services for providing information related to a variety of keywords such as a keyword that attracts attention or a keyword that is popular in a web page are being performed. For example, as one of the services, there is a service in which when a certain keyword attracting attention is present, a clue to discover the reason why the certain keyword attracts attention is suggested (see Patent Document 1).

The service disclosed in Patent Document 1 uses a technique of detecting and suggesting information having correlativity with information that the user desires to know. Specifically, in Patent Document 1, a keyword that co-occurs at a high frequency at a certain point in time and is close in occurrence time with respect to a keyword attracting attention is detected. A co-occurrence graph showing the keyword attracting attention and the detected keyword is created. The user can discover the reason why the keyword attracting attention attracts attention by analyzing the co-occurrence graph.

However, in the case of detecting information having, correlativity with information that the user desires to know by using the technique disclosed in Patent Document 1, even information recognized as having correlativity due to a coincidental cause may be detected.

The reason is as follows. That is, in the technique disclosed in Patent Document 1, not only co-occurrence at a high frequency with a keyword attracting attention at a designated point in time but also whether or not an appearance time is close to a designated point in time are used as conditions of correlativity determination. Thus, when an appearance time is close to a designated point in time, the determination is greatly influenced. Thus, in the case of using the technique disclosed in Patent Document 1, there is a problem in that information recognized as having correlativity due to the coincidental cause cannot be excluded.

For example, in the web pages on the Internet, a linguistic expression such as a description or an opinion related to an important event may be frequently recalled by a certain event and described by chance. In this case, information intrinsically having no correlativity may be erroneously recognized as having correlativity.

Meanwhile, linguistic expressions having semantically strong correlation tend to be very often continuously used, but it is typically difficult to determine whether a plurality of linguistic expressions appear at a time close to each other due to strong correlativity or incidentally appear at a time close to each other.

In this disclosure, a description representing a noun, a topic, an opinion, and an event in a text as well as a word including a keyword is referred to as a "linguistic expression." The "linguistic expression" may be a character string itself that appears in a text or a result obtained by analyzing a text by using an existing natural language processing technique such as morphological analysis, syntactic analysis, dependency analysis, or synonym processing.

Specifically, for example, "tobacco" and "health" are linguistic expressions each including one word. A dependency analysis result between words such as "tobacco→harmful" obtained by performing dependency analysis on a text "tobacco is very harmful to health" is also a linguistic expression representing one unitary meaning.

Patent Document 1: Japanese Unexamined Patent Application, First Publication No. 2006-164045

DISCLOSURE OF INVENTION

Problem to be Solved by the Invention

In order to solve the above problems, it is an object of the present invention to provide an information analysis device, an information analysis method, and a program in which correlativity between a plurality of linguistic expressions as an analysis target can be appropriately evaluated without being affected by the coincidental cause.

Means for Solving the Problem

To solve the above described problem, according to an aspect of the present invention, there is provided an information analysis device that uses a plurality of linguistic expressions as an analysis target, including:

a link information generating unit and a correlation value calculation unit, wherein the link information generating unit extracts time information included in each of a plurality of electronic documents including at least any one of the plurality of linguistic expressions and a relationship between the electronic documents in the plurality of electronic documents from the plurality of electronic documents, detects a link between one linguistic expression and another linguistic expression in the plurality of linguistic expressions and an appearance time of the link based on the extracted time information and the relationship between the electronic documents, and generates link information specifying the extracted link and the appearance time of the link, and the correlation value calculation unit specifies the number of appearances of links between the one linguistic expression and the other linguistic expression and an appearance time of each link based on the link information, and calculates a correlation value between the one linguistic expression and the other linguistic expression according to a degree that the link continuously appears by using the specified number of appearances of the link and the appearance time of each link.

In addition, to solve the above described problem, according to an aspect of the present invention, there is provided an information analysis method using a plurality of linguistic expressions as an analysis target, the information analysis method including:

(a) a step of extracting time information included in each of a plurality of electronic documents including at least any one of the plurality of linguistic expressions and a relationship between the electronic documents in the plurality of electronic documents from the plurality of electronic documents;

(b) a step of detecting a link between one linguistic expression and another linguistic expression in the plurality of linguistic expressions and an appearance time of the link based on the time information and the relationship between the electronic documents that are extracted in step (a), and generating link information specifying the detected link and the appearance time of the link; and (c) a step of specifying the number of appearances of links between the one linguistic expression and the other linguistic expression and an appearance time of each link based on the link information generated in step (b), and calculating a correlation value between the one linguistic expression and the other linguistic expression according to a degree that the link continuously appears by using the number of appearances of the link and the appearance time of each link.

In addition, to solve the above described problem, according to an aspect of the present invention, there is provided a program for causing a computer to execute information analysis using a plurality of linguistic expressions as an analysis target, the program causing the computer to execute:

(a) a step of extracting time information included in each of a plurality of electronic documents including at least any one of the plurality of linguistic expressions and a relationship between the electronic documents in the plurality of electronic documents from the plurality of electronic documents;

(b) a step of detecting a link between one linguistic expression and another linguistic expression in the plurality of linguistic expressions and an appearance time of the link based on the time information and the relationship between the electronic documents extracted in step (a), and generating link information specifying the detected link and the appearance time of the link; and (c) a step of specifying the number of appearances of links between the one linguistic expression and the other linguistic expression and an appearance time of each link based on the link information generated in step (b), and calculating a correlation value between the one linguistic expression and the other linguistic expression according to a degree that the link continuously appears by using the specified number of appearances of the link and the appearance time of each link.

Effect of the Invention

According to the present invention, due to the above described features, correlativity between a plurality of linguistic expressions as an analysis target is appropriately evaluated without being affected by the coincidental cause.

BRIEF DESCRIPTION OF THE DRAWINGS

FIG. 2 is a diagram illustrating an example of information stored in a storage device illustrated in FIG. 1.

FIG. 3 is a diagram illustrating an example of link information generated according to the first embodiment of the present invention.

FIG. 4 is a diagram illustrating another example of link information generated according to the first embodiment of the present invention.

BEST MODE FOR CARRYING OUT THE INVENTION

First Embodiment

Figure 1:
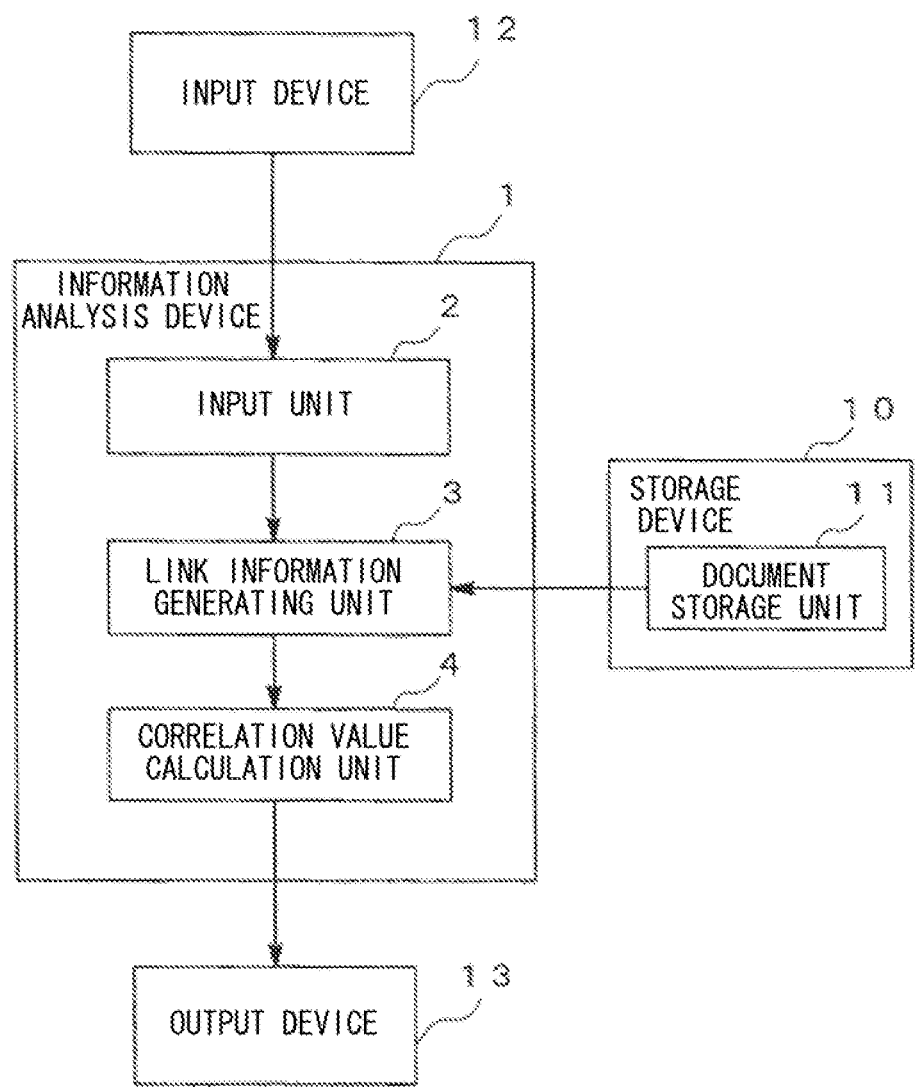
FIG. 1 is a block diagram illustrating a schematic configuration of an information analysis device according to a first embodiment of the present invention.

Hereinafter, an information analysis device, an information analysis method, and a program according to a first embodiment of the present invention will be described with reference to FIGS. 1 to 6. First, a configuration of the information analysis device according to the first embodiment of the present invention will be described with reference to FIGS. 1 to 4. FIG. 1 is a block diagram illustrating a schematic configuration of the information analysis device according to the first embodiment of the present invention. FIG. 2 is a diagram illustrating an example of information stored in a storage device illustrated in FIG. 1. FIG. 3 is a diagram illustrating an example of link information generated according to the first embodiment of the present invention. FIG. 4 is a diagram illustrating another example of link information generated according to the first embodiment of the present invention.

An information analysis device 1 illustrated in FIG. 1 is a device that has a plurality of linguistic expressions as an analysis target and is used to analyze correlativity between one linguistic expression and another linguistic expression. As illustrated in FIG. 1, the information analysis device 1 includes a link information generating unit 3 which generates link information and a correlation value calculation unit 4 which calculates a correlation value between the linguistic expressions.

The link information generating unit 3 first extracts time information included in each of a plurality of electronic documents including at least any one of a plurality of linguistic expressions and a relationship between the electronic documents in the plurality of electronic documents from the plurality of electronic documents. Based on the time information and the relationship between the electronic documents, the link information generating unit 3 detects a link between one linguistic expression and another linguistic expression in a plurality of linguistic expressions and an appearance time of a link, and generates link information specifying the link and the appearance time of the link.

The correlation value calculation unit 4 specifies the number of appearances of links between one linguistic expression and another linguistic expression and an appearance time of each link based on the link information. The correlation value calculation unit 4 calculates a correlation value between one linguistic expression and another linguistic expression according to a degree that the link continuously appears by using the specified number appearances of links and the appearance time of the link. Here, "a degree that the link continuously appears" means a degree representing the strength as to whether or not the link will be continuously present for a long time.

As described above, the information analysis device 1 detects the link between the linguistic expressions in view of the relationship between the documents including each linguistic expression as well as the time information related to the linguistic expression. Further, using the link, the correlation value is calculated and correlativity is determined. Therefore, the information analysis device 1 can avoid the situation in which the correlation value increases due to the coincidental cause and correlativity is erroneously determined.

Next, the configuration of the information analysis device 1 will be described in further detail. The following description will be made in connection with the case in which two linguistic expressions X and Y are analysis targets. As illustrated in FIG. 1, according to the first embodiment, the information analysis device 1 further includes an input unit 2 which receives the linguistic expressions as the analysis targets. The information analysis device 1 is connected to a storage device 10, an input device 12, and an output device 13.

The input device 12 is connected to the input unit 2 of the information analysis device 1 from the outside and inputs information such as the linguistic expressions that are the analysis targets to the input unit 2. Specific examples of the input device 12 may include a keyboard and a mouse. The output device 13 is a device which outputs the analysis result. Specific examples of the output device 13 may include a display device such as a liquid crystal display (LCD) device and a printer. The input device 12 and the output device 13 may be mounted in another computer device connected to the information analysis device 1 via a network.

The storage device 10 includes a document storage unit 11 in a storage area and is used for generation of link information by the link information generating unit 3. Specifically, the storage device 10 may be implemented by storing a data file in a storage device such as a hard disk (a magnetic disk storage device) or by loading a recording medium storing a data file into a read device. Further, the storage device 10 may be connected directly to the information analysis device 1 or may be installed in another computer device connected to the information analysis device 1 via a network.

As illustrated in FIG. 2, the document storage unit 11 stores a number of electronic documents. FIG. 2 schematically expresses a storage area of the storage device 10, which functions as the document storage unit 11, in a table form, but the storage area may be expressed in any other form.

In FIG. 2, each row in a horizontal direction represents one electronic document stored in the document storage unit 11. The document storage unit 11 stores an identifier (a document ID), time information, and a reference document ID as well as a document content on each electronic document. Such information is stored in association with each electronic document as data of one set.

As illustrated in FIG. 2, in the first embodiment of the present invention, as the time information, date information specifying year-month-day is stored. For example, a document of a document ID "10001" is stored in association with a date expressed as "2004/4/15." In the example of FIG. 2, only year, month and day is used as the time information, but the first embodiment is not limited to this example. For example, time information specifying time, minute, and second as well as year, month, and day may be used. Further, a time obtained by integrating a unit time such as a second unit with reference to a certain point in time may be used as the time information.

In the first embodiment, the reference document ID is set based on a reference relationship between the stored electronic documents. Specifically, if the electronic document is extracted from the web page on the Internet, the reference document ID is acquired based on hyperlink information. That is, the document ID of the electronic document extracted from the web page of the link destination stated in the original web page is used. Further, when the electronic document is described in a hypertext markup language (HTML) format, the document ID and the reference ID may be expressed by a uniform resource locator (URL).

Alternatively, in the first embodiment, the reference document ID may be set based on a logical relationship between the stored electronic documents. As the logical relationship between the electronic documents, a similarity relationship or an adversary relationship may be used. For example, the reference document ID may be set based on a similarity relationship between the stored electronic documents or an adversary relationship between the stored electronic documents. In the former case, a document ID of another electronic document having a semantically similar content is stored as the reference document ID.

Further, in the former case, a determination on whether contents are semantically similar can be performed by extracting a document vector having a morpheme as a unit from each electronic document and calculating a cosine similarity degree between the electronic documents using the document vector. For example, electronic documents that exceed a previously set threshold value may be set as similar electronic documents. Several electronic documents that are highest in a degree of similarity may be set as the similar electronic documents.

In the latter case, first, for example, a negative expression is added to a characteristic linguistic expression in the electronic document to generate a linguistic expression adverse to the linguistic expression. The electronic document including the adversary linguistic expression is extracted, and an ID of the extracted electronic document is stored as the reference document ID. A method of extracting an electronic document having the logical relationship is not limited to the above-described examples but may be implemented in various forms in a range that does not depart from the scope of the present invention.

In the first embodiment, when the linguistic expression is input from the input unit 2 as the analysis target, the link information generating unit 3 first accesses the document storage unit 11 of the storage device 10 and searches the electronic document including the input linguistic expression.

Specifically, let us assume that a linguistic expression X "Aseismatic gel is effective" and a linguistic expression Y "earthquake occurred" are input to the input unit 2. In this case, as a result of search, electronic documents of document IDs "10001" and "11003" including the linguistic expression X and electronic documents of document IDs "10102" and "12004" including the linguistic expression Y are specified from the document storage unit 11 illustrated in FIG. 2.

At this time, in the first embodiment, the link information generating unit 2 can search the electronic document including a synonymous linguistic expression (a synonymous expression) having the semantically same content as well as a linguistic expression that simply coincides in character string. The synonymous expression may include a linguistic expression that coincides in sentence structure with the input linguistic expression or a linguistic expression obtained by making a paraphrase of a part of the input linguistic expression by a synonym.

Next, if the search is completed, the link information generating unit 3 extracts time information included in each of a plurality of electronic documents and a relationship between the electronic documents in the plurality of electronic documents from the plurality of electronic documents specified by the search. In the first embodiment, the link information generating unit 3 extracts the reference document ID illustrated in FIG. 2 as the relationship between the electronic documents. Specifically, the time information and the reference document ID of each of the electronic documents of the document IDs "10001," "10102," "11003," and "12004" specified by the search are extracted.

Subsequently, the link information generating unit 3 detects a link between the linguistic expression X and the linguistic expression Y based on the time information and the reference document ID. According to the first embodiment, in order to increase the accuracy degree of the correlation value which will be described later, the link information generating unit 3 also specifies the appearance time of the link as well as the detected link when the link is detected.

Specifically, in the example illustrated in FIG. 2, as the reference document ID of the document ID "10102" specified by the search, the document ID "10001" specified by the search is stated. In this case, the link information generating unit 3 detects one link between the linguistic expression X and the linguistic expression Y from the document IDs "10001" and "10102." Further, in this case, the time information of the electronic document of the document ID "10001" and the time information of the electronic document of the document ID "10102" are associated with each other and detected as the appearance time of the link.

Similarly, the link information generating unit 3 also detects one link between the linguistic expression X and the linguistic expression Y from the document IDs "11003" and "12004." The time information of the electronic document of the document ID "11003" and the time information of the electronic document of the document ID "12004" are associated with each other, and times included in the time information are detected as the appearance time of the link.

Thereafter, the link information generating unit 3 generates link information specifying the detected link and the appearance time of each link. Specifically, in the first embodiment, as illustrated in FIG. 3, the link information generating unit 3 generates link information between the linguistic expression X and the linguistic expression Y. Further, in FIG. 3, the link information between the linguistic expression X and the linguistic expression Y is schematically expressed in a table form, but the link information may be expressed in any other form.

In the example of FIG. 3, each row in a horizontal direction represents one link, and the number of appearances of links is N (n and N are arbitrary natural numbers that satisfy n<N). Further, in the example of FIG. 3, the appearance time representing a time of a linguistic expression at which each link appears is associated with each link for each linguistic expression. The appearance time corresponds to a time included in the time information of the electronic document including each linguistic expression.

For example, a link of No. 1 of FIG. 3 represents a link between the electronic document of the document ID "10001" and the electronic document of the document ID "10102." The appearance time of the link in the linguistic expression X of the link coincides with the time included in the time information of the electronic document of the document ID "10001," and the appearance time of the link in the linguistic expression Y coincides with the time included in the time information of the electronic document of the document ID "10102."

Further, in the example of FIG. 3, only the time information is associated. However, for example, when the link has directionality, information representing a linguistic expression as a link source and a linguistic expression as a link destination (information representing a link source and a link destination) may be associated.

Further, in the example of FIG. 3, each link is associated with the appearance time of each linguistic expression. However, it may be associated only with the appearance time of any one of the linguistic expressions. Further, as illustrated in FIG. 4, the link information generating unit 3 may acquire a representative time such as an intermediate time between the appearance time of one linguistic expression and the appearance time of another linguistic expression. In this case, the acquired representative time may be associated with the link as the appearance time of the link. As described above, when one link is associated with one appearance time (the representative time), a processing speed in the link information generating unit 3 can be improved.

Further, in the first embodiment, the reference document ID may be set based on a similarity relationship between the stored electronic documents or may be set based on an adversary relationship between the stored electronic documents. In the former case, the link information generating unit 3 extracts a semantic similarity relationship between the electronic documents and then extracts the link between the linguistic expressions based on the extracted semantic similarity relationship. In the latter case, the link information generating unit 3 extracts a semantically adversary relationship between the electronic documents and then extracts the link between the linguistic expressions based on the extracted adversary relationship. If there is no direct reference relationship between the electronic documents in either of the former case or the latter case, the link information between the linguistic expressions may be generated.

In the first embodiment, the correlation value calculation unit 4 specifies the number N of appearances of links based on the link information illustrated in FIG. 3 and also specifies the appearance time of each link. The correlation value calculation unit 4 calculates a correlation value R between the linguistic expressions according to a degree that the link continuously appears by using the number N of appearances of links and the appearance time of each link. Specifically, the correlation value calculation unit 4 can calculate the correlation value R between the linguistic expressions using the following Equation (1).

$$R = f(N) \times g(dt_{max}) \qquad (1)$$

In Equation (1), f(N) is a function which increases according to a value of the number N of appearances used in calculation. Specifically, an equation "f(N)=log(N)" may be used as f(N). Alternatively, an equation "f(N)=α×log(N)" may be used as f(N). "α" is a weight coefficient. For example, a value normalized by N that is a maximum value of the number of appearances of links used for calculation may be used as "α." "α" acquired as described above corrects an influence of f(N) on the correlation value.

In Equation (1), $dt_{max}$ represents a difference between the appearance time of the latest link and the appearance time of the first link. $g(dt_{max})$ is a function that increases depending on a value of $dt_{max}$, and the degree that the link continuously appears is considered. For example, an equation "$g(dt_{max})=\log(1+dt_{max})$" may be used.

The correlation value calculation unit 4 may calculate the correlation value between the linguistic expressions using the following Equation (2).

$$R = \frac{f(N)}{\beta + V} \quad (2)$$

In Equation (2), f(N) is the same function as f(N) used in Equation (1). "β" is a correction value of a constant number other than 0 (zero). Further, V is a value obtained by representing the degree that the link continuously appears by using a time interval between the neighboring links or a variance related to the appearance density of the link. For example, V may be acquired by using Equation (3) or (4) below. Equation (3) is a variance related to a time interval between the appearance times between the links.

$$V = \frac{1}{N-1} \sum_{n=1}^{N-1} (dT - dt_n)^2 \quad (3)$$

In Equation (3), dT represents a mean value obtained by lining up the appearance times (the representative values) of the links obtained from the link information in time series and averaging the time intervals between the neighboring links. "$dt_n$" represents a difference between the appearance time of an n-th link and the appearance time of an (n+1)-th link.

In Equation (3), "V" may be obtained by calculating a square root of V and substituting a standard deviation. Further, "V" may be acquired using the following Equation (4) by using a variance related to the appearance density of the links at a predetermined time interval.

$$V = \frac{1}{M} \sum_{m=1}^{M} (dQ - dq_m)^2 \quad (4)$$

In Equation (4), in represents a number attached to sections obtained when a time period from the appearance time of the first link between the linguistic expressions as a calculation target to the appearance time of the latest link is divided into a predetermined time interval. M represents the number of sections. $dq_m$ represents the number of links in an m-th section. That is, $dq_m$ represents the appearance density of the links.

In Equation (4), dQ represents a mean value obtained by averaging $dq_m$. That is, dQ represents a mean value of the appearance density of the links. According to Equation (4), if the number N of links is much larger than M, the processing speed can be improved. Using Equation (4), it is possible to suppress the influence resulting from the fact that the time interval between the neighboring links is much smaller than the time interval between the sections further than the case of using Equation (3). Even in Equation (4), "V" may be acquired by calculating a square root of V and substituting a standard deviation.

Equation (2) has an effect of decreasing an influence resulting from a deviation of distribution of links. For example, let us consider a link between a linguistic expression of interest and a linguistic expression that occurs incidentally. The time interval between the neighboring links remarkably changes greatly, and a difference between a maximum value and a minimum value of the time interval has a large value. If the correlation value R is calculated by applying Equation (2) to such linguistic expressions, the correlation value R has a small value. Thus, Equation (2) is effective when it is desired to emphasize only the link between the linguistic expressions that are in an important relationship.

Further, the correlation value calculation unit 4 may calculate the correlation value R between the linguistic expression using Equation (5).

$$R = \frac{f(N)}{\beta + H(P)} \quad (5)$$

In Equation (5), f(N) is the same function as f(N) used in Equation (1). "β" is a correction value of a constant number other than 0 (zero). H(P) is entropy of a probability distribution P of the link between the linguistic expressions and may be obtained using the following Equation (6).

$$H(P) = -\sum_{m=1}^{M} P_m \log P_m \quad (6)$$

In Equation (6), m represents a number attached to sections obtained by dividing a time period from the appearance time of the first link between the linguistic expressions as a calculation target to the appearance time of the latest link into a predetermined time interval. M represents the number of sections. $P_m$ represents a probability that the link will be present in an m-th section. $P_m$ is calculated by $P_m = N_m/N$ by using the number N of appearances of links between the linguistic expressions as a calculation target and the number $N_m$ of appearances of links that appear in an m-th section.

For example, the number $N_m$ of appearances of links that appear in the m-th section may be calculated by counting the number of links that appear in the m-th section focusing on the earlier appearance time if two appearance times are specified on one link. Further, when the representative time that is an intermediate time between the two appearance times is already determined, the number of links may be counted focusing on the representative time instead of focusing on the earlier appearance time.

Equation (5) is effective in the case of acquiring a correlation value on each of A between the linguistic expressions and B between the linguistic expressions and acquiring correlativity between A between the linguistic expressions and B between the linguistic expressions. For example, let us assume that A between the linguistic expressions and B between the linguistic expressions are equal in number of links and variance calculated from the time interval between all links. In this case, according to Equation (5), since a deviation of distribution of links is considered, correlativity between the linguistic expressions is acquired with the high degree of certainty.

According to the first embodiment, when the semantic content of the electronic document is emphasized, a correlation value R' may be calculated using the following Equation (7) by using a similarity degree S, which will be described later, calculated based on semantic similarity between the electronic documents related to each link as a weight.

$$R' = R \times S \quad (7)$$

In Equation (7), R is the correlation value R of Equations (1), (2), and (5). The similarity degree S in Equation (7) may be calculated, for example, using the following Equation (8) below.

$$S = \frac{1}{N} \sum_{n=1}^{N} sim(DX_n, DY_n) \quad (8)$$

Equation (8) represents an arithmetic average of a result of calculating a semantic similarity degree function $sim(DX_n, DY_n)$ between the electronic documents related to an n-th link between the linguistic expression X and the linguistic expression Y.

In Equation (8), the semantic similarity degree function $sim(DX_n, DY_n)$ may be calculated based on a vector space model. For example, $DX_n$ is a feature vector of a document related to the linguistic expression X in the n-th link, and $DY_n$ is a feature vector of a document related to the linguistic expression Y in the n-th link. In this case, the semantic similarity degree function $sim(DX_n, DY_n)$ may be calculated by using the cosine of an angle between the feature vectors.

Specifically, a word in the electronic document including the linguistic expression X may be used as a component of the feature vector $DX_n$, and a word in the electronic document including the linguistic expression Y may be used as a component of the feature vector $DY_n$. The feature vector $DX_n$ and the feature vector $DY_n$ may be set to include a value, which uses an appearance frequency tf (Term Frequency) of each word in the electronic document or an inverse number idf (Inverse Document Frequency) of the appearance frequency in all electronic documents as a target as a weight, in a vector element.

Further, the semantic similarity degree function $sim(DX_n, DY_n)$ may be calculated by using a well-known similarity degree measure between the documents. In the first embodiment, the calculation technique of Equation (8) or the similarity degree function $sim(DX_n, DY_n)$ is not limited to the above described technique.

The similarity degree in the m-th section may be calculated and used in Equation (4) or (6) instead of Equation (7). For example, the similarity degree $S_m$ in the m-th section may be calculated using the following Equation (9).

$$S_m = \frac{1}{N_m} \sum_{k=1}^{N_m} sim(DX_k, DY_k) \qquad (9)$$

$N_m$ of Equation (9) is the number of appearances of links that appear in the m-th section. "k" represents an order of links that appear in the m-th section. Preferably, the semantic similarity degree function $sim(DX_n, DY_n)$ is calculated in a similar manner to Equation (8).

Further, when Equation (9) is applied to Equation (4), for example, $dq_m$ in Equation (4) is preferably calculated using the following Equation (10).

$$dq_m = N_m \times S_m \qquad (10)$$

Further, when Equation (9) is applied to Equation (6), for example, instead of $P_m$, $P_m = P_m \times S_m$ is preferably used in Equation (6). Alternatively, $P_m$ of Equation (6) is preferably calculated using the following Equation (11).

$$P_m = \frac{\sum_{k=1}^{N_m} sim(DX_k, DY_k)}{\sum_{n=1}^{N} sim(DX_n, DY_n)} \qquad (11)$$

If contents of the two electronic documents connected by the link have nothing to do with each other, the influence of the link on the correlation value between the linguistic expressions gets weak by using Equations (7), (9), (10), and (11). Meanwhile, if the contents of the two electronic documents connected by the link are similar to each other, the influence of the link on the correlation value between the linguistic expressions increases. For this reason, when Equations (7), (9), (10), and (11) are used, semantically strong correlation can be evaluated without being influenced by a temporary coincidental relationship.

For example, let us consider the case in which the reference document ID (see FIG. 2) is acquired from hyperlink information of the web page. Generally, since there is a correlation between web pages connected by the hyperlink information, there is considered to be correlativity between the electronic documents. However, a link that has nothing to do with an important content in the web page may be included.

In this case, if Equations (7), (9), (10), and (11) are used, when contents between the web pages semantically have nothing to do with each other, the influence of the link gets weak, and when contents between the web pages are semantically similar, the influence of the link is more emphasized. Therefore, a more appropriate correlation value can be calculated.

Figure 5:
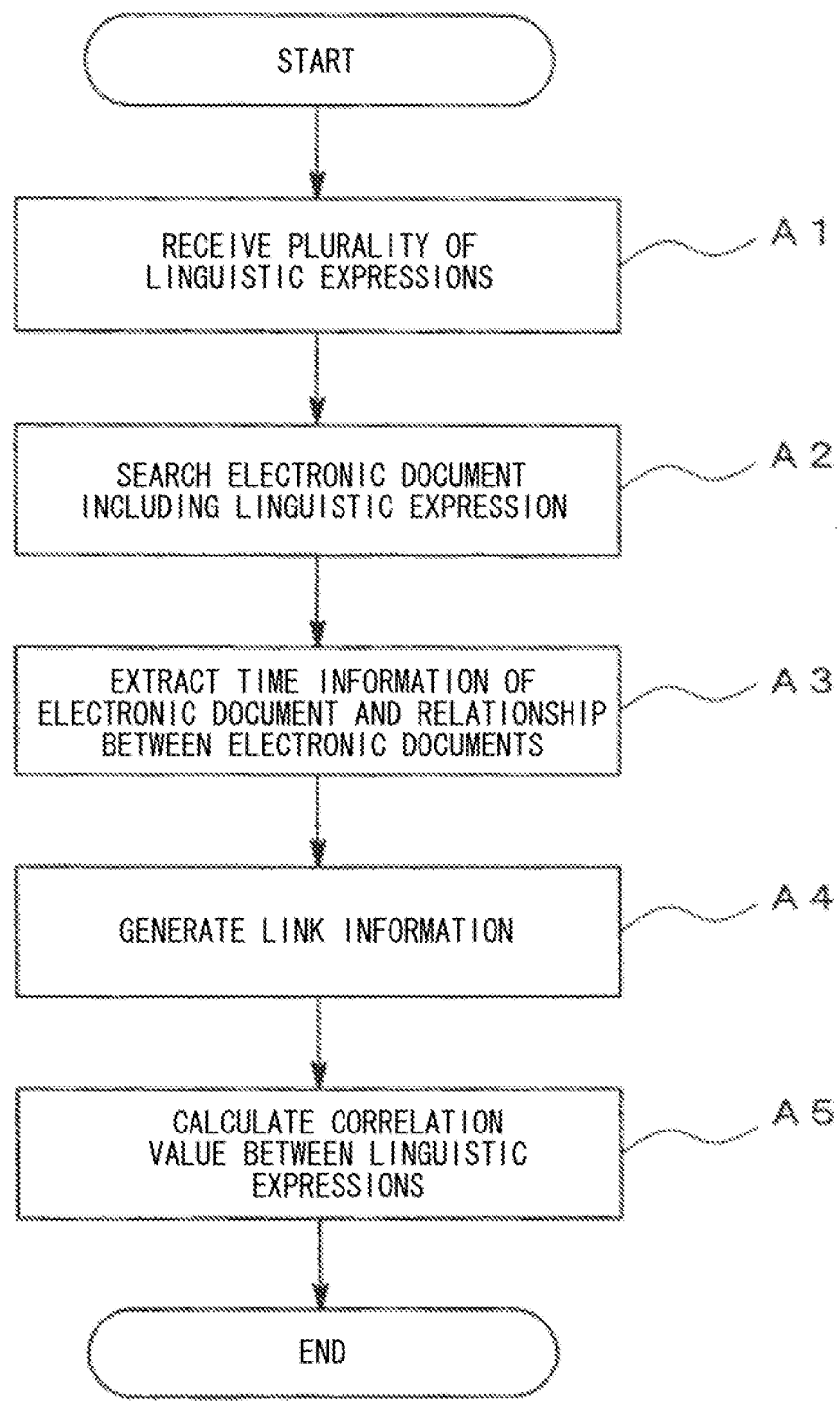
FIG. 5 is a flowchart illustrating the process flow in an information analysis method according to the first embodiment of the present invention.

Next, an information analysis method according to the first embodiment of the present invention will be described with reference to FIG. 5. FIG. 5 is a flowchart illustrating the process flow in the information analysis method according to the first embodiment of the present invention. The information analysis method according to the first embodiment of the present invention is implemented by operating the information analysis device 1 according to the first embodiment of the present invention illustrated in FIG. 1. Thus, the following description will be made in connection with an operation of the information analysis device 1 with reference to FIG. 1.

As illustrated in FIG. 5, first, the input unit 2 receives a plurality of linguistic expressions that are analysis targets (step A1). In the first embodiment, the input unit 2 receives a linguistic expression X and a linguistic expression Y and inputs the linguistic expression X and the linguistic expression Y to the link information generating unit 3.

Next, when the linguistic expressions are received, the link information generating unit 3 accesses the document storage unit 11 of the storage device 10 and searches the electronic documents including the input linguistic expressions (step A2). In the present embodiment, the electronic document including at least one of the linguistic expression X and the linguistic expression Y is searched.

Next, if the search is completed, the link information generating unit 3 extracts time information included in each of a plurality of electronic documents and a relationship between the electronic documents in a plurality of electronic documents from a plurality of electronic documents specified by the search (step A3). In the first embodiment, as the relationship between the electronic documents, the previously set reference ID (see FIG. 2) is extracted from a reference relationship between the electronic documents.

Next, the link information generating unit 3 detects a link between the linguistic expressions based on the time information and the relationship between the electronic documents extracted in step A3 (step A4). In the first embodiment, a link between the linguistic expression X and the linguistic expression Y is detected, and the appearance time of the link is also detected. Link information specifying the link and the appearance time is generated (see FIGS. 3 and 4). The link information generating unit 3 inputs the link information to the correlation value calculation unit 4.

Next, the correlation value calculation unit 4 specifies the number of appearances of links between the linguistic expressions based on the link information generated in step A4 and calculates the correlation value R by using the number of appearances of links (step A5). In the first embodiment, the correlation value is calculated by using the appearance time of each link as well as the number of appearances of links.

Calculation of the correlation value is performed by any one of Equations (1), (2), (5), and (7) described above or a combination thereof.

Thereafter, if the correlation value calculation unit 4 outputs the calculated correlation value R to the output device 13, the process in the information analysis device is finished. The information analysis device 1 remains in a stopped state until a next linguistic expression is input.

As described above, according to the information analysis method of the first embodiment, the link between the linguistic expressions is detected in view of the relationship between the documents including each linguistic expression as well as the time information related to the linguistic expressions. Thus, reliability of the correlation value increases, and the situation that correlativity is erroneously determined due to the coincidental cause is avoided.

The information analysis device 1 in the first embodiment may be implemented by installing a program capable of causing a computer to execute step A1 to step A5 illustrated in FIG. 5, and executing the program. This point will be described with reference to FIG. 6.

Figure 6:
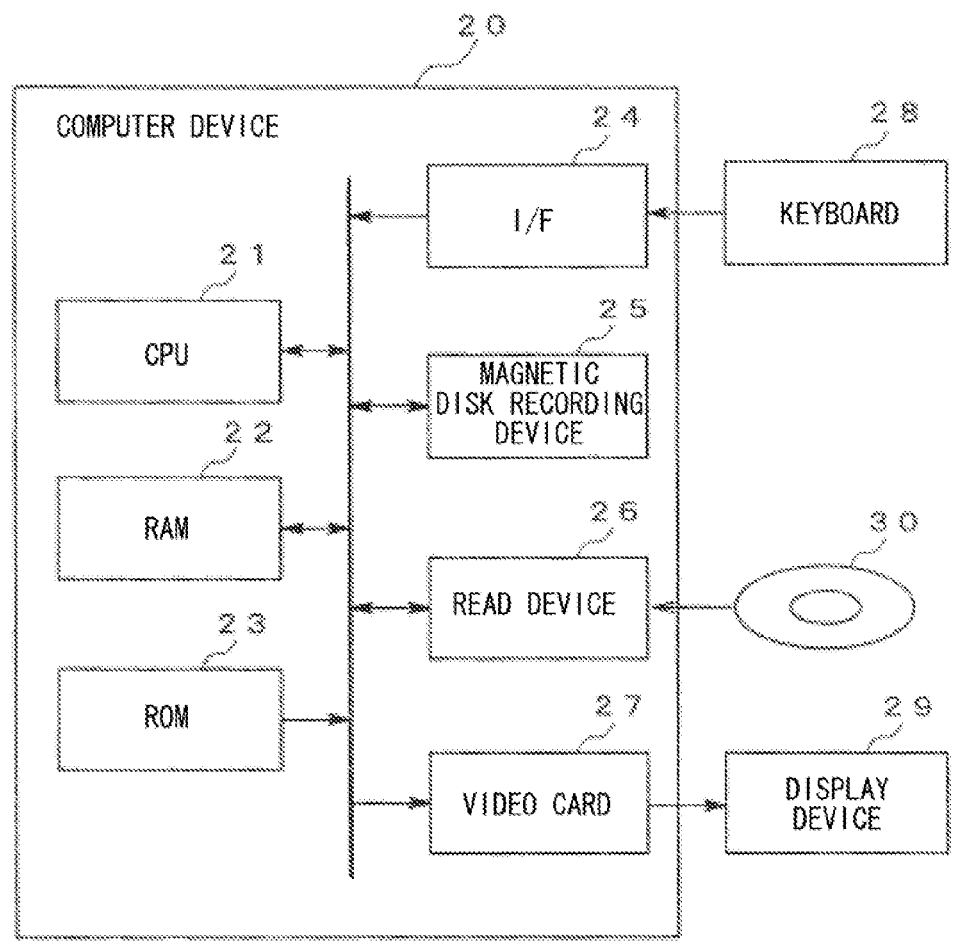
FIG. 6 is a diagram illustrating a computer device capable of implementing the information analysis device 1 illustrated in FIG. 1.

FIG. 6 is a diagram illustrating a computer device capable of implementing the information analysis device 1 illustrated in FIG. 1. As illustrated in FIG. 6, a computer device 20 includes a CPU (central processing unit) 21, a RAM (random access memory) 22, a ROM (read only memory) 23, an interface (I/F) circuit 24, an optical magnetic disk storage device (a hard disk) 25, a read device 26, and a video card 27.

In the example of FIG. 6, the interface circuit 24 functions as the input unit 2. A keyboard 28 is used as the input device (see FIG. 1), and the keyboard 28 is connected to the interface circuit 24. A display device 29 is used as the output device (see FIG. 1), and the display device 29 is connected to the video card 27.

Further, in the example of FIG. 6, a storage area of the magnetic disk storage device 25 is used as the document storage unit 11 (see FIG. 1). A number of electronic documents are stored in the storage area. Further, a program for causing the computer device 20 to execute steps A1 to A5 illustrated in FIG. 5 is stored in a recording medium 30.

The program stored in the recording medium 30 is installed in the computer device 20 through the read device 26 configured of, for example, an optical disk device. If the installed program is executed, the CPU 21 functions as the link information generating unit 3 and the correlation value calculation unit 4 to thereby implement the information analysis device 1.

In the example of FIG. 6, the document storage unit 11 (see FIG. 1) may be implemented by loading the recording medium storing a number of electronic documents into the read device 26. Further, the document storage unit 11 may be built in another computer device connected to the computer device 20 via a network.

Second Embodiment

Figure 7:
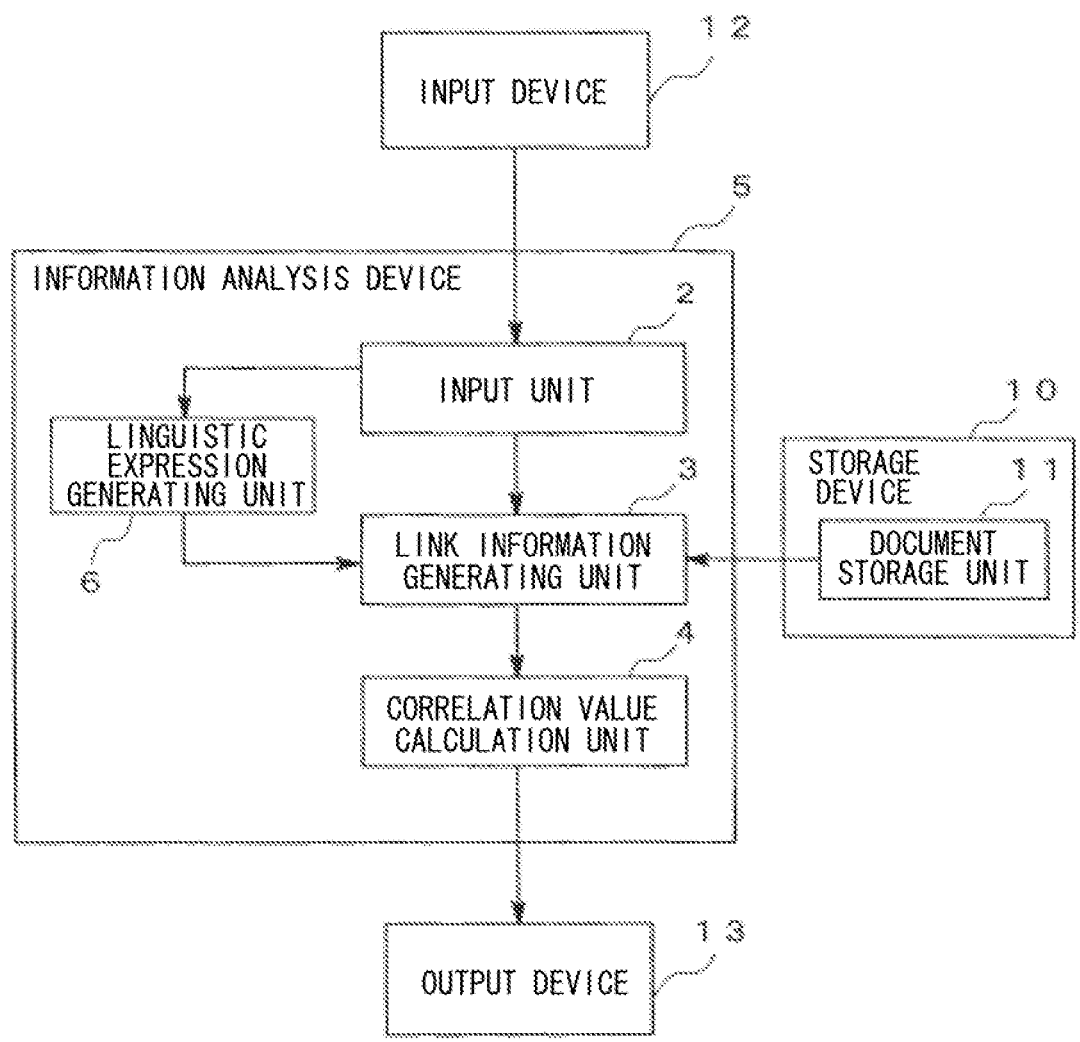
FIG. 7 is a block diagram illustrating a schematic configuration of an information analysis device according to a second embodiment of the present invention.

Next, an information analysis device, an information analysis method, and a program according to a second embodiment of the present invention will be described with reference to FIGS. 7 and 8. First, a configuration of the information analysis device according to the second embodiment of the present invention will be described with reference to FIG. 7. FIG. 7 is a block diagram illustrating a schematic configuration of the information analysis device according to the second embodiment of the present invention.

As illustrated in FIG. 7, an information analysis device 5 according to the second embodiment of the present invention includes a linguistic expression generating unit 6 and is different from the information analysis device 1 (see FIG. 1) according to the first embodiment in this point. Differences between the information analysis device 5 according to the second embodiment and the information analysis device 1 according to the first embodiment will be described below in further detail.

In the second embodiment, the input unit 2 receives any one of a pair of linguistic expressions that are analysis targets. The input unit 2 inputs the received linguistic expression to the linguistic expression generating unit 6 as well as the link information generating unit 3. Hereinafter, the input linguistic expression is referred to as "input linguistic expression."

The linguistic expression generating unit 6 generates another linguistic expression (hereinafter, referred to as "relevant linguistic expression") relevant to the input linguistic expression. In the present embodiment, the linguistic expression generating unit 6 generates one relevant linguistic expression on one input linguistic expression. Further, the linguistic expression generating unit 6 inputs the generated relevant linguistic expression to the link information generating unit 3.

Specifically, let us assume that the input linguistic expression is a linguistic expression X "Aseismatic gel is effective." In this case, the linguistic expression generating unit 6 may generate a relevant linguistic expression "Aseismatic gel is not effective" by adding a negative expression "Not" to the linguistic expression X "Aseismatic gel is effective" and adjusting a conjugation.

The relevant linguistic expression is not limited to the above described example. For example, the linguistic expression generating unit 6 may generate a linguistic expression adverse to the input linguistic expression as the relevant linguistic expression. Further, the linguistic expression generating unit 6 may extract the linguistic expression that co-occurs with the input linguistic expression from among the electronic documents stored in the document storage unit 11 and generate the extracted linguistic expression as the relevant linguistic expression.

When the linguistic expression and the relevant linguistic expression are received, the link information generating unit 3 generates the link information between the linguistic expression and the relevant linguistic expression. That is, the link information generating unit 3 first extracts time information included in the electronic document and a relationship between the electronic documents from the electronic document including the input linguistic expression and the electronic document including the relevant linguistic expression, respectively. Subsequently, the link information generating unit 3 detects the link between the input linguistic expression and the relevant linguistic expression based on the time information and the relationship between the electronic documents and generates link information specifying the detected link.

In the present embodiment, the correlation value calculation unit 4 specifies the number of appearances of links between the input linguistic expression and the relevant linguistic expression and the appearance time of each link. The correlation value calculation unit 4 calculates the correlation value between the input linguistic expression and the relevant linguistic expression according to the degree that the link continuously appears by using the number of appearances of links and the appearance time of each link.

As described above, the information analysis device 5 according to the second embodiment is different from the information analysis device 1 according to the first embodiment in that the linguistic expression generating unit 6 is disposed, and the link information generating unit 3 and the correlation value calculation unit 4 use the relevant linguistic expression as the processing target. Except for these points, the information analysis device 5 is similar in configuration to the information analysis device 1.

Next, an information analysis method according to the second embodiment will be described with reference to FIG. 8. FIG. 8 is a flowchart illustrating the process flow in the information analysis method according to the second embodiment of the present invention. The information analysis method according to the second embodiment of the present invention is implemented by operating the information analysis device 5 according to the second embodiment of the present invention illustrated in FIG. 7. Thus, the following description will be made in connection with an operation of the information analysis device 5 with reference to FIG. 7.

Figure 8:
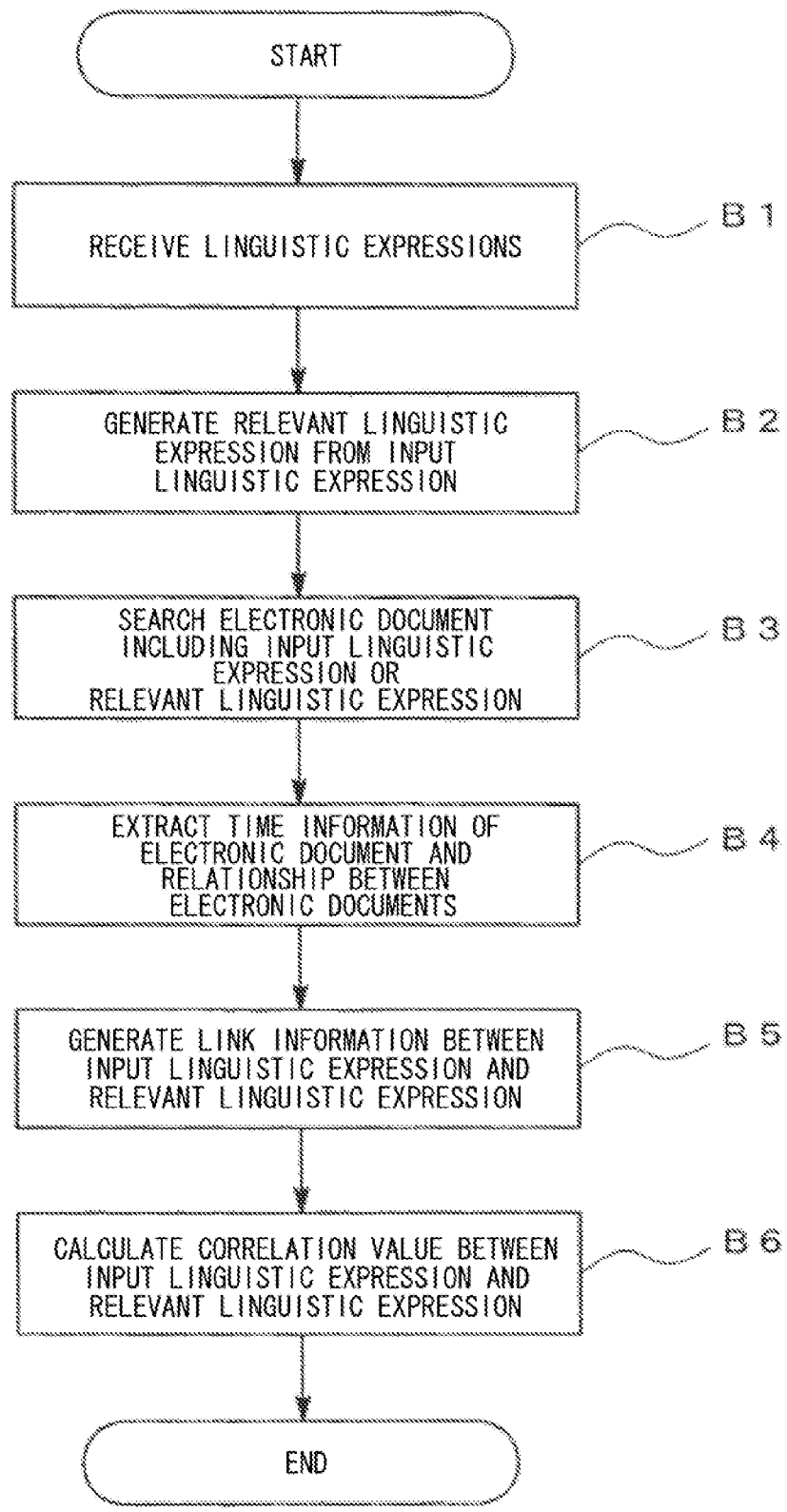
FIG. 8 is a flowchart illustrating the process flow in an information analysis method according to the second embodiment of the present invention.

As illustrated in FIG. 8, first, the input unit 2 receives one of a pair of linguistic expressions that are analysis targets (step B1). The received linguistic expression (the input linguistic expression) is input to the link information generating unit 3 and the linguistic expression generating unit 6. In step B1, the number of the received linguistic expressions is not limited to one but may be two or more. However, according to the second embodiment, when two or more linguistic expressions are input, the correlation value between the input linguistic expressions is not calculated, unlike the first embodiment.

Next, the linguistic expression generating unit 6 generates the relevant linguistic expression based on the input linguistic expression (step B2). The generated relevant linguistic expression is input to the link information generating unit 3. Subsequently, when the relevant linguistic expression and the input linguistic expression are received, the link information generating, unit 3 accesses the document storage unit 11 of the storage device 10 and searches the electronic document including at least one of the relevant linguistic expression and the input linguistic expression (step B3). According to the present embodiment, the electronic document including at least any one of the linguistic expression X and the linguistic expression Y is searched.

Next, if the search is completed, the link information generating unit 3 extracts time information included in each of a plurality of electronic documents and a relationship between the electronic documents in a plurality of electronic documents from a plurality of electronic documents specified by the search (step B4).

Next, the link information generating unit 3 detects the link between the input linguistic expression and the relevant linguistic expression based on the time information and the relationship between the electronic documents extracted in step B4 and generates link information (step B5).

Next, the correlation value calculation unit 4 specifies the number of appearances of links between the input linguistic expression and the relevant linguistic expression and the appearance time of each link based on the link information generated in step B4. The correlation value calculation unit 4 calculates the correlation value R according to the degree that the link continuously appears by using the number of appearances of links and the appearance time of each link (step B6). Even in the second embodiment, calculation of the correlation value R is performed by any one of Equations (1), (2), (5), and (7) described in the first embodiment or a combination thereof.

Thereafter, if the correlation value calculation unit 4 outputs the calculated correlation value R to the output device 13, the process in the information analysis device 5 is finished. The information analysis device 5 remains in a stopped state until a next linguistic expression is input.

As described above, according to the second embodiment, when the linguistic expression is input, the linguistic expression relevant to the input linguistic expression is generated, and the correlation value therebetween is calculated. The second embodiment is effective in the case of acquiring a keyword relevant to a keyword of interest. Even in the second embodiment, similarly to the first embodiment, reliability of the correlation value is high, and the situation that correlativity is erroneously determined due to the coincidental cause is avoided.

INDUSTRIAL APPLICABILITY

The present invention can be applied to uses such as an information searching device having a time-series relationship as a search condition or an information classifying device using a determination result of a time-series relationship. Further, the present invention can be applied to uses such as a text mining device that aims to find information relevant to a linguistic expression that is an analysis target.

REFERENCE SYMBOLS

1: Information analysis device (first embodiment)
2: Input unit
3: Link information generating unit
4: Correlation value calculation unit
5: Information analysis device (second embodiment)
6: Linguistic expression generating unit
10: Storage device
11: Document storage unit
12: Input device
13: Output device
20: Computer device
21: CPU
22: RAM
23: ROM
24: Interface circuit
25: Magnetic disk recording device
26: Read device
27: Video card
28: Keyboard
29: Display device
30: Recording medium

The invention claimed is:

1. An information analysis device that uses a plurality of linguistic expressions as an analysis target, comprising:
a link information generating unit and a correlation value calculation unit, the link information generating unit and the correlation value calculation unit being implemented by a CPU,
wherein the link information generating unit extracts time information included in each of a plurality of electronic documents including at least any one of the plurality of linguistic expressions and a relationship between the electronic documents in the plurality of electronic documents from the plurality of electronic documents, detects a link between one linguistic expression and another linguistic expression in the plurality of linguistic expressions and an appearance time of the link based on the extracted time information and the relationship between the electronic documents, and generates link information specifying the extracted link and the appearance time of the link, and
the correlation value calculation unit specifies the number of appearances of links between the one linguistic expression and the other linguistic expression and an appearance time of each link based on the link information, and calculates a correlation value between the one linguistic expression and the other linguistic expression by using the specified number of appearances of the link and the appearance time of each link, the calculation of the correlation value being made by using a function that increases depending on a difference between first appearance time of one link and second appearance time of another link.

2. The information analysis device according to claim 1, wherein the link information generating unit extracts a reference relationship between the one linguistic expression and the other linguistic expression in the plurality of electronic documents as the relationship between the electronic documents in the plurality of electronic documents.

3. The information analysis device according to claim 1, wherein the link information generating unit extracts a similarity relationship between the one linguistic expression and the other linguistic expression in the plurality of electronic documents as the relationship between the electronic documents in the plurality of electronic documents.

4. The information analysis device according to claim 1, wherein the link information generating unit extracts an adversary relationship between the one linguistic expression and the other linguistic expression in the plurality of electronic documents as the relationship between the electronic documents in the plurality of electronic documents.

5. The information analysis device according to claim 1, wherein the link information generating unit detects either or both of a time included in the time information of the electronic document including the one linguistic expression and a time included in the time information of the electronic document including the other linguistic expression as the appearance time of the link.

6. The information analysis device according to claim 1, wherein the link information generating unit calculates an intermediate time between a time included in the time information of the electronic document including the one linguistic expression and a time included in the time information of the electronic document including the other linguistic expression and uses the calculated intermediate time as the appearance time of the link.

7. The information analysis device according to claim 1, further comprising:
   an input unit that receives a first linguistic expression as an analysis target; and
   a linguistic expression generating unit that generates a second linguistic expression relevant to the first linguistic expression,
   wherein the plurality of linguistic expressions are the first linguistic expression and the second linguistic expression,
   the one linguistic expression is the first linguistic expression, and
   the another linguistic expression is the second linguistic expression.

8. An information analysis method using a plurality of linguistic expressions as an analysis target, the information analysis method comprising:
   (a) a step of extracting time information included in each of a plurality of electronic documents including at least any one of the plurality of linguistic expressions and a relationship between the electronic documents in the plurality of electronic documents from the plurality of electronic documents;
   (b) a step of detecting a link between one linguistic expression and another linguistic expression in the plurality of linguistic expressions and an appearance time of the link based on the time information and the relationship between the electronic documents that are extracted in step (a), and generating link information specifying the detected link and the appearance time of the link; and
   (c) a step of specifying the number of appearances of links between the one linguistic expression and the other linguistic expression and an appearance time of each link based on the link information generated in step (b), and calculating a correlation value between the one linguistic expression and the other linguistic expression by using the number of appearances of the link and the appearance time of each link, the calculation of the correlation value being made by using a function that increases depending on a difference between first appearance time of one link and second appearance time of another link,
   wherein each step is implemented by a CPU.

9. The information analysis method according to claim 8, wherein step (a) comprises extracting a reference relationship between the one linguistic expression and the other linguistic expression in the plurality of electronic documents as the relationship between the electronic documents in the plurality of electronic documents.

10. The information analysis method according to claim 8, wherein step (a) comprises extracting a similarity relationship between the one linguistic expression and the other linguistic expression in the plurality of electronic documents as the relationship between the electronic documents in the plurality of electronic documents.

11. The information analysis method according to claim 8, wherein step (a) comprises extracting an adversary relationship between the one linguistic expression and the other linguistic expression in the plurality of electronic documents as the relationship between the electronic documents in the plurality of electronic documents.

12. The information analysis method according to claim 8, wherein step (b) comprises detecting either or both of a time included in the time information of the electronic document including the one linguistic expression and a time included in the time information of the electronic document including the other linguistic expression as the appearance time of the link.

13. The information analysis method according to claim 8, wherein step (b) comprises calculating an intermediate time between a time included in the time information of the electronic document including the one linguistic expression and a time included in the time information of the electronic document including the other linguistic expression, and using the calculated intermediate time as the appearance time of the link.

14. The information analysis method according to claim 8, further comprising:
   (d) a step of receiving a first linguistic expression as an analysis target; and
   (e) a step of generating a second linguistic expression relevant to the first linguistic expression,
   wherein the plurality of linguistic expressions are the first linguistic expression and the second linguistic expression,
   the one linguistic expression is the first linguistic expression, and
   the another linguistic expression is the second linguistic expression.

15. A non-transitory computer readable medium containing a program for causing a computer to execute information analysis using a plurality of linguistic expressions as an analysis target, the program causing the computer to execute:

(a) a step of extracting time information included in each of a plurality of electronic documents including at least any one of the plurality of linguistic expressions and a relationship between the electronic documents in the plurality of electronic documents from the plurality of electronic documents;

(b) a step of detecting a link between one linguistic expression and another linguistic expression in the plurality of linguistic expressions and an appearance time of the link based on the time information and the relationship between the electronic documents extracted in step (a), and generating link information specifying the detected link and the appearance time of the link; and (c) a step of specifying the number of appearances of links between the one linguistic expression and the other linguistic expression and an appearance time of each link based on the link information generated in step (b), and calculating a correlation value between the one linguistic expression and the other linguistic expression according to a degree that the link continuously appears by using the specified number of appearances of the link and the appearance time of each link, the calculation of the correlation value being made by using a function that increases depending on a difference between first appearance time of one link and second appearance time of another link.

16. The non-transitory computer readable medium according to claim 15, wherein step (a) comprises extracting a reference relationship between the one linguistic expression and the other linguistic expression in the plurality of electronic documents as the relationship between the electronic documents in the plurality of electronic documents.

17. The non-transitory computer readable medium according to claim 15, wherein step (a) comprises extracting a similarity relationship between the one linguistic expression and the other linguistic expression in the plurality of electronic documents as the relationship between the electronic documents in the plurality of electronic documents.

18. The non-transitory computer readable medium according to claim 15, wherein step (a) comprises extracting an adversary relationship between the one linguistic expression and the other linguistic expression in the plurality of electronic documents as the relationship between the electronic documents in the plurality of electronic documents.

19. The non-transitory computer readable medium according to claim 15, wherein step (b) comprises detecting either or both of a time included in the time information of the electronic document including the one linguistic expression and a time included in the time information of the electronic document including the other linguistic expression as the appearance time of the link.

20. The non-transitory computer readable medium according to claim 15, wherein step (b) comprises calculating an intermediate time between a time included in the time information of the electronic document including the one linguistic expression and a time included in the time information of the electronic document including the other linguistic expression, and using the calculated intermediate time as the appearance time of the link.

21. The non-transitory computer readable medium according to claim 15, further causing the computer to execute before step (a):

(d) a step of receiving a first linguistic expression as an analysis target; and (e) a step of generating a second linguistic expression relevant to the first linguistic expression, wherein the plurality of linguistic expressions are the first linguistic expression and the second linguistic expression, the one linguistic expression is the first linguistic expression, and the another linguistic expression is the second linguistic expression.

* * * * *